(12) United States Patent
Li et al.

(10) Patent No.: US 9,743,483 B2
(45) Date of Patent: *Aug. 22, 2017

(54) TECHNIQUES FOR LUMEN MAINTENANCE AND COLOR SHIFT COMPENSATION

(71) Applicant: OSRAM SYLVANIA Inc., Wilmington, MA (US)

(72) Inventors: Ming Li, Acton, MA (US); Qi Dai, Sanghai (CN); Keng Chen, Sudbury, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,917

(22) Filed: Apr. 8, 2016

(65) Prior Publication Data

US 2016/0227621 A1 Aug. 4, 2016

Related U.S. Application Data

(63) Continuation of application No. 14/321,148, filed on Jul. 1, 2014, now Pat. No. 9,335,210.

(51) Int. Cl.
*G01J 1/02* (2006.01)
*G01J 1/16* (2006.01)
(Continued)

(52) U.S. Cl.
CPC ........ *H05B 33/0869* (2013.01); *G01J 1/0228* (2013.01); *G01J 1/0238* (2013.01);
(Continued)

(58) Field of Classification Search
CPC .... G01J 1/16; G01J 1/58; G01J 1/0228; G01J 1/0238; G01J 2001/1673; H05B 33/0869
(Continued)

(56) References Cited

U.S. PATENT DOCUMENTS 5,754,294 A * 5/1998 Jones ..................... G01B 11/06
356/432
6,411,558 B1 * 6/2002 Tanaka ................. H03K 17/162
365/200

(Continued)

OTHER PUBLICATIONS

Eric Richman, Understanding IES LM-79 & IES LM-80, LightFair Exhibit Presentation, May 5-7, 2009, pp. 1-15.
(Continued)

*Primary Examiner* — Sang Nguyen
(74) *Attorney, Agent, or Firm* — Shaun P. Montana

(57) ABSTRACT

Techniques are disclosed for maintaining consistent lumen output of a lighting assembly over time. By maintaining a consistent lumen output, it is possible to maintain acceptable color stability where color mixing of multiple outputs is used. The lighting assembly may be any lighting configuration that might suffer from lumen depreciation and/or color drift over time, and may include any type(s) of light source(s) that may be monitored and driven accordingly. The lighting assembly, in addition to light source(s), includes a photo detector and a directed light source, such as a laser. The directed light source provides a golden sample for use in calibrating the photo detector, which in turn monitors lumen output of the light source(s). Drive signals are adjusted to account for lumen depreciation of the monitored light source(s).

11 Claims, 5 Drawing Sheets

(51) Int. Cl.
*H05B 33/08* (2006.01)
*G01J 1/58* (2006.01)

(52) U.S. Cl.
CPC . *G01J 1/16* (2013.01); *G01J 1/58* (2013.01); *G01J 2001/1673* (2013.01)

(58) Field of Classification Search
USPC ................. 356/213–236, 243.8; 250/226
See application file for complete search history.

(56) References Cited

U.S. PATENT DOCUMENTS

| | | | | |
|---|---|---|---|---|
| 6,507,159 B2* | 1/2003 | Muthu | ................. | G01J 3/51 315/307 |
| 7,956,551 B1* | 6/2011 | Gordin | ................. | H05B 41/40 315/291 |
| 8,749,172 B2* | 6/2014 | Knapp | ............... | H05B 33/0869 315/185 R |
| 8,928,249 B2* | 1/2015 | Raj | ................. | H05B 33/0863 315/153 |
| 2005/0018184 A1* | 1/2005 | Imura | ................. | G01J 3/10 356/300 |
| 2005/0047134 A1* | 3/2005 | Mueller | ............. | F21V 23/0442 362/231 |
| 2006/0000963 A1* | 1/2006 | Ng | ............. | G01J 3/10 250/205 |
| 2007/0188425 A1* | 8/2007 | Saccomanno | ........ | G09G 3/3406 345/82 |
| 2009/0051910 A1* | 2/2009 | Imura | ................ | G01J 3/0254 356/243.8 |
| 2011/0163162 A1* | 7/2011 | Coutant | ............. | G06K 7/10732 235/455 |
| 2012/0206050 A1* | 8/2012 | Spero | ..................... | B60Q 1/04 315/152 |
| 2013/0009551 A1* | 1/2013 | Knapp | ............... | H05B 33/0869 315/152 |
| 2013/0200806 A1* | 8/2013 | Chobot | .................. | H05B 37/02 315/151 |
| 2014/0052220 A1* | 2/2014 | Pedersen | ............. | A61N 5/0618 607/88 |

OTHER PUBLICATIONS

Olivier J Juillot, International Search Report and Written Opinion of the International Searching Authority for PCT/US15/36659, dated Oct. 2, 2015, pp. 1-10, European Patent Office, Rijswijk, The Netherlands.

* cited by examiner

TECHNIQUES FOR LUMEN MAINTENANCE AND COLOR SHIFT COMPENSATION

CROSS-REFERENCE TO RELATED APPLICATION

The present application is a continuation of, and claims priority of U.S. patent application Ser. No. 14/321,148, entitled "TECHNIQUES FOR LUMEN MAINTENANCE AND COLOR SHIFT COMPENSATION" and filed Jul. 1, 2014, now U.S. Pat. No. 9,335,210, the entire contents of which are hereby incorporated by reference.

TECHNICAL FIELD

The present invention relates to lighting, and more specifically, to lighting systems and devices including one or more solid state light sources.

BACKGROUND

Solid state light sources, such as but not limited to light emitting diodes (LEDs), have become a popular choice for various lighting systems, such as traffic signals, backlights, displays and general illumination. Devices including solid state light sources provide numerous advantages over traditional light sources, such as lower power consumption, lack of environmentally dangerous materials, and significantly longer lifetime. Full life testing for solid state light sources, though, is often impractical, due to their theoretical lifetimes. For instance, testing an LED to substantiate a lifetime claim of 50,000 hours would require that the LED be continuously powered all day, every day, for over five and half years.

SUMMARY

One disadvantage of solid state light sources is that their brightness (i.e., light output, measured in lumens, and thus also referred to as lumen output) degrades over time. Indeed, all light sources—both traditional and semiconductor-based—generally have a light output that degrades over time. However, some traditional light sources (such as incandescent and halogen) simply burn out before substantial loss of light output occurs. LEDs, for example, tend not to burn out, and so light output from LEDs continues to degrade over time. This continued degradation is generally referred to as lumen depreciation. Thus, LED lifetime is typically measured in the amount of time that passes prior to lumen depreciation causing the LED to output light having an unacceptably low level of lumens. What exactly is an unacceptably low level of lumens may depend, for example, on the specific lighting application or a given lighting standard. For instance, in a general lighting environment (e.g., an office), lumen depreciation may not be noticeable until an LED dims to 70% of its original light output. In other applications, a higher or lower threshold may be required.

The rate at which an LED experiences lumen depreciation is dependent upon numerous factors, such as but not limited to, manufacturing defects, material composition, heat management, and power, among others. Moreover, not all LEDs exhibit lumen depreciation on the same scale—whether the LEDs are in different lighting devices or are within the same lighting device. To this end, there are a number of non-trivial challenges related to maintaining lumen output.

Embodiments provide techniques for maintaining a consistent or otherwise acceptable lumen output over a lifetime of a lighting assembly. By maintaining a consistent lumen output, it is further possible to maintain a consistent or otherwise acceptable color stability in the case where color mixing of multiple lumen outputs is used. The lighting assembly may be, for example, a lamp, luminaire, light engine, or any other lighting device that might suffer from lumen depreciation and/or color drift over time, and that includes any type or types of light source(s), such as solid state light sources, incandescent light sources, gas discharge lamps, or any other light source that can be monitored and powered as provided herein. According to embodiments, a lighting assembly is configured with one or more illumination light sources, a photo detector, and a directed light source, such as a laser. The directed light source and the one or more illumination light sources are initially measured to determine respective baseline lumen output measurements (intensity measurements). A subsequent measurement of the directed light source intensity can then be performed at periodic measurement intervals (e.g., every 1000 hours or other suitable interval). Because the lumen output of the directed light source remains relatively constant, any measurable difference in the lumen output of the directed light source can actually be attributed to the photo detector. In particular, the relative (proportional) difference between the baseline intensity measurement of the directed light source and the subsequent intensity measurement of the directed light source at the measurement interval can be used to determine photo detector degradation, thereby effectively providing a calibration factor for the photo detector. This calibration factor can then be taken into account when that same photo detector is used to measure the intensity of a given illumination light source. As such, the resulting calibrated measurement of the intensity of the given illumination light source more accurately reflects the lumen output of that illumination light source, because measurement error introduced by photo detector degradation is minimized or otherwise reduced. In this way, lumen depreciation of the illumination light source can be determined, using the corresponding initial baseline intensity measurement of the illumination light source and a subsequent calibrated intensity measurement of the illumination light source by the photo detector. The lumen depreciation, if any, can be converted into a corresponding change in the drive signal that powers the illumination light sources, and the resulting changed drive signal can be supplied (in real-time) to the one or more illumination light sources to compensate for that lumen depreciation and/or color shift. As used herein, a drive signal includes, for example but not limited to, a current for driving illumination light sources or a pulse-width modulation (PWM) generated signal in order to vary a power supply duty cycle of the lighting assembly. While the techniques are particularly suitable for lighting assemblies including one or more solid state light sources, they can readily be extended to other types of light sources as well, as will be appreciated.

In an embodiment, there is provided a lighting assembly. The lighting assembly includes: a diffusible light source to illuminate an area by providing light output, wherein the provided light output is measured in lumens; a photo detector configured to measure lumen output of the diffusible light source and a golden sample light beam; and a directed light source to provide the golden sample light beam, wherein the golden sample light beam is used to calibrate the photo detector.

In a related embodiment, the lighting assembly may further include: a controller configured to determine a photo detector calibration factor based on a first lumen output measurement of the directed light source and a second lumen output measurement of the directed light source, the calibration factor indicative of photo detector degradation over a period of time between the first lumen output measurement and the second lumen output measurement. In a further related embodiment, the controller may be further configured to command application of a drive signal to the lighting assembly, the drive signal accounting for the photo detector calibration factor so as to compensate for photo detector degradation, wherein the drive signal causes the diffusible light source to illuminate an area by providing light.

In another related embodiment, the diffusible light source may include one or more solid state light sources. In yet another related embodiment, the directed light source may include a laser. In still another related embodiment, the directed light source may include a mirror to direct the golden sample light beam to the photo detector. In yet still another related embodiment, the diffusible light source may receive a drive signal, wherein the drive signal may account for a photo detector calibration factor so as to compensate for degradation of the photo detector.

In another embodiment, there is provided a method of controlling a lighting assembly. The method includes: outputting illumination via a diffusible light source; providing a golden sample light beam via a directed light source to a photo detector; determining a photo detector calibration factor based on a first lumen output measurement of the directed light source and a second lumen output measurement of the directed light source, the calibration factor being indicative of photo detector degradation over a period of time between the first lumen output measurement and the second lumen output measurement; and adjusting a drive current of the lighting assembly provided to the diffusible light source so as to compensate for degradation of the photo detector.

In a related embodiment, outputting may include outputting illumination via a diffusible light source, wherein the diffusible light sources comprises one or more solid state light sources. In another related embodiment, providing may include providing a golden sample light beam via a directed light source to a photo detector, wherein the directed light source comprises a laser. In still another related embodiment, providing a golden sample light beam includes projecting the golden sample light beam on to a mirror, the mirror providing a direct path to the photo detector. In yet another related embodiment, the method may further include determining a lumen output difference based on an initial lumen output measurement of the diffusible light source and a further lumen output measurement of the diffusible light source, the further lumen output measurement being adjusted based on the calibration factor; and adjusting a drive current of the diffusible light source based on the lumen output difference so as to compensate for lumen output depreciation of the diffusible light source over a period of time between the initial lumen output measurement and the further lumen output measurement. In a further related embodiment, adjusting the drive current of the diffusible light source may include maintaining color stability of the lighting assembly. In another further related embodiment, adjusting the drive current of the diffusible light source may include maintaining lumen output of the lighting assembly. In still another further related embodiment, determining the lumen output difference based on the initial lumen output measurement and the further lumen output measurement of the diffusible light source may be repeated every period of operation of the lighting assembly.

In another embodiment, there is provided a lighting assembly. The lighting assembly includes: a diffusible light source configured to provide illumination of an area via color mixed light output measured in lumens; a photo detector configured to measure lumen output of each color of the diffusible light source and a golden sample light beam; a directed light source to provide the golden sample light beam to use in calibrating the photo detector; and a controller configured to determine a photo detector calibration factor based on a first lumen output measurement of the directed light source and a second lumen output measurement of the directed light source, the calibration factor indicative of photo detector degradation over a period of time between the first lumen output measurement and the second lumen output measurement.

In a related embodiment, the diffusible light source may include a first solid state light source and a second solid state light source, wherein the first solid state light source may output light of a first color, wherein the second solid state light source may output light of a second color, and the first color may be different from the second color. In another related embodiment, the directed light source may include a laser. In still another related embodiment, the diffusible light source may receive a drive signal, wherein the drive signal may account for the photo detector calibration factor so as to compensate for photo detector degradation. In a further related embodiment, the directed light source may include at least one of a coherent light source and a collimated-and-focused light source.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
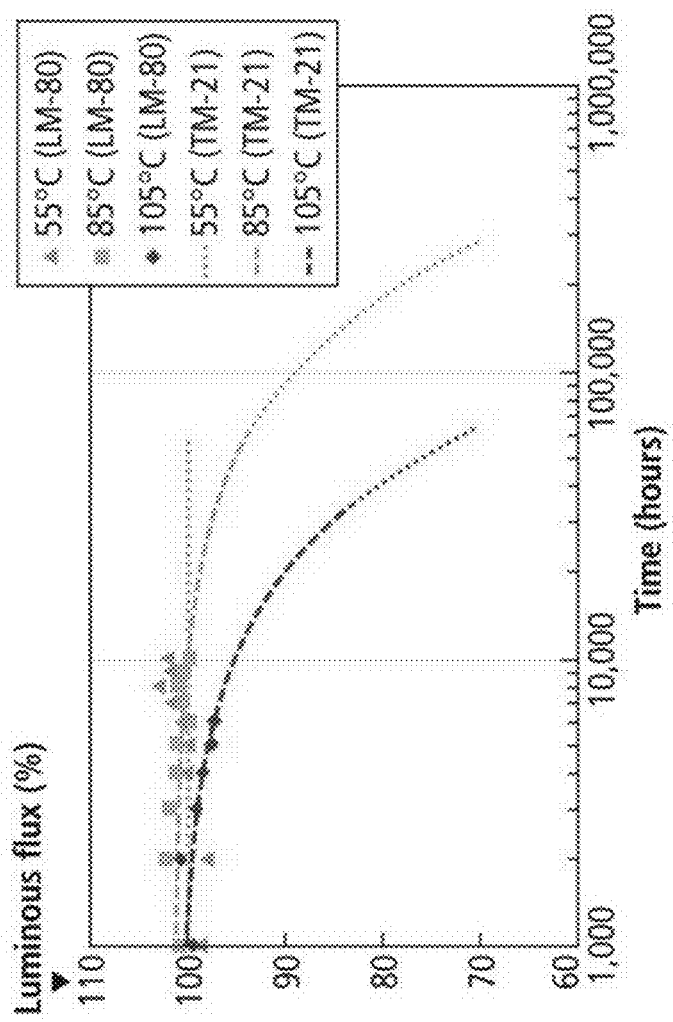
FIG. 1 is a graph illustrating results for an example LM-80 test with extrapolated TM-21 projections, and generally shows how lumen output from a solid state light source drops over time.

As discussed above, there are a number of non-trivial issues related to maintaining lumen output to meet lifetime claims for light sources. To this end, standards have been recently implemented to enable consumers to compare the relative performance of LEDs and other solid state light sources in a range of operating scenarios. One such standard is IES-LM-80: Approved Method for Measuring Lumen Maintenance of LED Light Sources. LM-80 prescribes uniform testing methods for determining the amount of light output maintained over time (lumen maintenance) for LED packages, arrays, or modules. During these tests, an LED device is operated for at least 6,000 hours at particular operating temperatures. Periodically (every 1000 hours), photometric measurements and a correlated color point are collected, which provides a luminous flux value. The intent of the LM-80 standard was to provide a basic understanding of how an LED device will perform over time in regard to lumen maintenance. TM-21-2011 (Projecting Long Term Lumen Maintenance of LED Light Sources), referred to as "TM-21", was developed as a companion method to estimate LED lumen maintenance and service life beyond the required 6,000 hours of actual testing. TM-21 introduced the use of "L" values such as L70, L50, L30, etc. In each case, L stands for lumen maintenance and the number is the percentage of light output remaining. For example, L70 would designate how many operating hours prior to an LED degrading to 70% of its original output. FIG. 1 is a graph illustrating results for an example LM-80 test with extrapolated TM-21 projections, and generally shows how LED lumen output drops over time. As shown, luminous flux (i.e., lumen output) was measured every 1000 hours for an LED operating at 55° C., 85° C., and 105° C. As can be further seen, each operating temperature includes a respective TM-21 depreciation projection (illustrated as a curve) which is extrapolated from the LM-80 data points. However, these projections are based on average values and do not take into account the individual characteristics of an LED and operating characteristics that may impact actual lumen depreciation. These factors include, for example, manufacturing defects, material composition, operating temperature, and power, among others.

Figure 2:
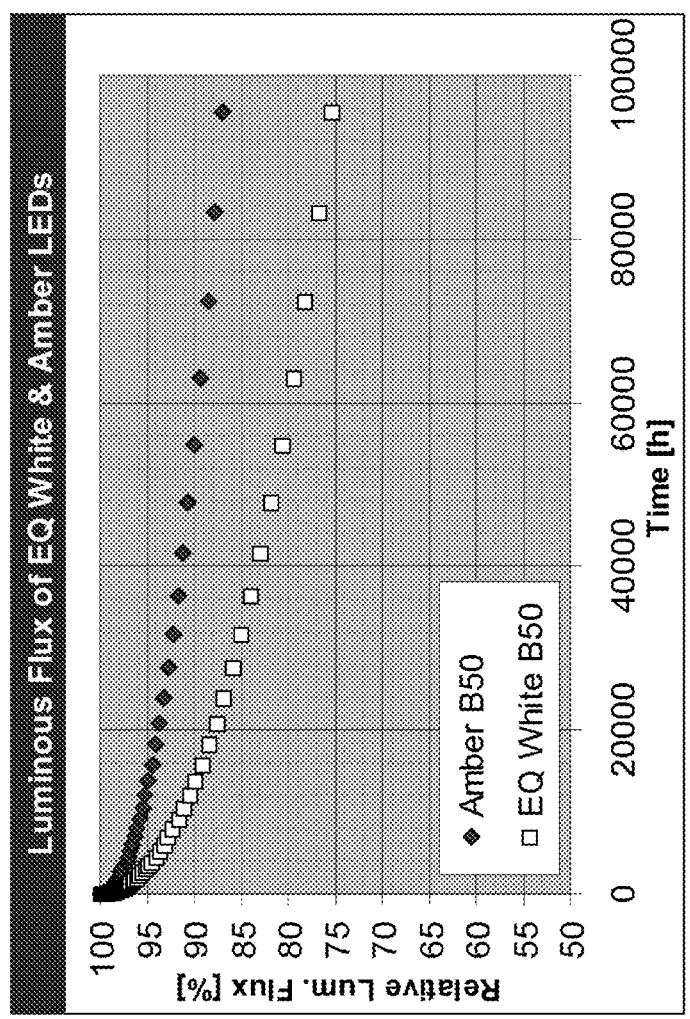
FIG. 2 is a graph illustrating lumen depreciation curves of two different color LEDs, which when used in color mixing applications, can lead to color shift.

Another aspect of lumen depreciation is that lighting systems and/or devices configured to color mix with two or more different types of solid state light sources will tend to experience color shift over time. This behavior is due, in part, to the disparate rates at which different types of light sources experience lumen depreciation. One such example case is illustrated in FIG. 2, which illustrates the relative lumen depreciation curves of two different LEDs that might be used in color mixing applications. As shown, the graph illustrates the projected rate of a lumen depreciation of an EQ white LED (InGaN blue LED+phosphor), which is greater than that of amber LED (InGaAlP red LED). Over time, this disparity in lumen depreciation rates can result in a visible difference in color output (i.e., color shift). There is presently no approved method for projecting color shift to end of life for an LED in a given color mixing application.

One approach to address lumen depreciation during normal operation of a lighting system/device in order to maintain a consistent lumen output throughout the lifetime of the lighting system/device includes a photodiode configured to measure LED output intensity (i.e., light output in lumens) in real time. This real time output intensity is then compared to an initial lumen output value. The difference between the later-measured lumen output versus the initial lumen output is then converted into a forward current, which is used to drive the LED differently so as to compensate for the difference. However, photodiodes themselves become less accurate as they age. Thus, and as will be appreciated in light of this disclosure, compensation methods not contemplating photodiode degradation can be unsuitable, particularly given that the potential lifetime of an LED is great (e.g., capable of 50k+ hours of operation). Another approach might include the case where a reference LED is provided and turned on only occasionally (e.g., once every 1000 hours) in order to keep the reference LED at a constant output over the lifetime of the lighting system. A relative difference between an initial lumen output of the reference LED and a subsequent reference lumen output of the reference LED (as measured using a photodiode) can then be used to calibrate measurements of the other LEDs. However, note that the reference LED output is lambertian. As a result, the reference LED light dispersion causes collection efficiency of the photodiode to be relatively low. In addition, the spectrum of a photodiode is relatively wide and the signal to noise ratio is low. Therefore, the reference measurements may not accurately reflect the true lumen output of the reference LED.

Thus, and in accordance with embodiments of the present disclosure, techniques are provided for active optical feedback and compensation in a lighting assembly using a photo detector in conjunction with a directed light source (e.g., a coherent light source such as but not limited to a laser, a laser diode, and/or other low-divergence or collimated-and-focused light source(s) that remain(s) relatively constant with respect to its lumen output over a target usage period of the lighting assembly). This directed light source is referred to throughout as a "golden sample", a reference laser, or reference laser device, though other suitable directed light sources will be apparent. In operation, the lighting assembly periodically performs calibration of the photo detector by comparing baseline measurements of the directed light source against subsequent measurements of that directed light source. In this calibration scenario, the relative difference between baseline measurements of the directed light source and the subsequent measurements represents degradation of the photo detector, and can be used to establish a calibration factor for the photo detector. This is because the lumen output of the directed light source remains relatively constant, so any measurable difference in the lumen output of the directed light source can actually be attributed to the photo detector. To this end, measurements by the photo detector of one or more light sources of the lighting assembly may be adjusted (i.e., calibrated) based on the determined degradation. In some embodiments, a direct path is provided between the directed light source and the photo detector. As a result, a high signal to noise ratio is achieved, enabling an accurate measurement of the golden sample. In some embodiments, a mirror is positioned relative to the directed light source and the photodiode so as to provide the direct path for the emitted light of the directed light source. In some embodiments, the lighting assembly further includes a controller and/or control circuitry programmed, for example, with one or more algorithms that control measurement of the golden sample of the directed light source in order to calibrate the photo detector.

Once the golden sample and the corresponding photo detector calibration factor are established, the light output of a lighting assembly can be measured periodically, for example, by the calibrated photo detector, in order to determine a relative difference between the measured light output and a baseline measurement. To this end, the relative difference can be converted into a drive signal and applied via driver circuitry of the lighting assembly to the light source(s), so as to maintain a consistent lumen output throughout normal operation of the lighting assembly. Thus, compensation for photo detector degradation enables the lighting assembly to maintain a constant lumen output and/or maintain color stability for at least the rated number of hours of the lighting assemblies (e.g., such as the rating indicated by an L rating of L70, L50, etc, in the case of LED-based lighting assemblies).

In addition to maintaining lumen output, and therefore overcoming the issue of dimming and color shift, a number of other benefits associated with the measurement techniques provided herein will be apparent in light of this disclosure. For instance, a light source being monitored is not limited to LEDs or other solid state light sources. Any type of light source may be measured and tracked in accordance with aspects and embodiments disclosed herein. In addition, one or more solid state light sources may also be used as a photo detector. Because solid state light sources are sensitive to wavelengths equal to or less than the predominate wavelength emitted thereby, a solid state light source may be multiplexed so that it may be used for both light emission and detection at different times. To this end, while some embodiments may include a dedicated photo detector, another embodiment may include one or more dual purpose solid state light sources that may be utilized as both a light source and a photo detector.

As previously explained, to maintain a constant lumen output and/or mitigate color shift in a lighting assembly, a directed light source (e.g., a reference laser) may be utilized as a "golden sample", in accordance with some embodiments. In these embodiments, the golden sample is used to calibrate a photo detector such that subsequent measurements are accurate regardless of the age/degraded quality of the photo detector. Various compensation schemes may then be employed to control a driving circuit in order to compensate for deviations in measured lumen output versus initial (baseline) output. Each of these functions can be implemented, for example, using a microcontroller having a processing capability and a number of embedded routines for carrying out the functionality as described herein. Alternatively, the microcontroller may be configured with hardware to carry out the various functions. Alternatively, the control logic can be implemented with gate-level logic or purpose-built semiconductor, such as an application specific integrated circuit (ASIC) or field programmable gate array (FPGA). In a more general sense, the control logic can be implemented with any combination of software, firmware and/or hardware. Numerous control logic schemes and configurations will be apparent in light of this disclosure.

Figure 3:
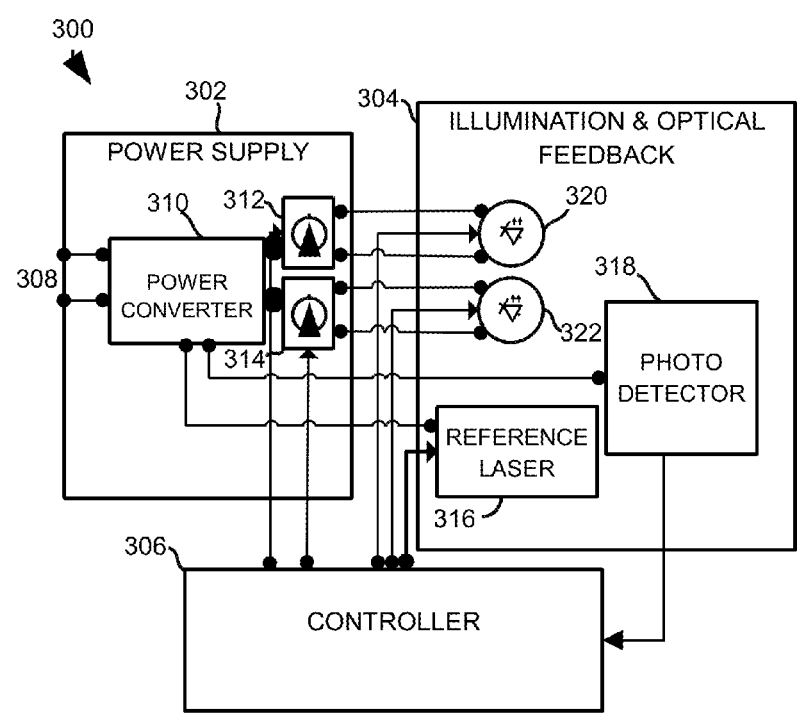
FIG. 3 is a schematic diagram illustrating a lighting system according to embodiments disclosed herein.

FIG. 3 is a schematic diagram of a lighting system 300, including a power supply 302, illumination and optical feedback 304, and a controller 306. The power supply 302 is, in some embodiments, configured to convert power received at an input 308 into suitable form via a power converter 310, in order to supply current sources 312 and 314, the controller 306, a reference laser 316, and a photo detector 318. Typically, input power received at the input 308 is provided by AC mainline power. To this end, the power converter 310, in some embodiments, includes a rectifier (not shown in FIG. 1) that is configured to receive an AC supply current and output DC power. In some embodiments, an output of the rectifier of the power converter 310 is coupled to a DC-DC converter. In such embodiments, the DC-DC converter may be any one of numerous converters known in the art, such as a fly-back converter, a buck converter, a forward converter, etc. The current sources 312 and 314, coupled to the power converter 310, are adjustable current sources, such that a configurable amount of current may be supplied to one or more light sources, such as light sources 320 and 322, based on control logic. In some embodiments, the power supply 302, including the power converter 310 and the current sources 312 and 314, comprises a driver circuit. It should be noted that other types of driver circuits may be utilized in aspects and embodiments disclosed herein, such as a traditional ballast circuit for a gas discharge lamp. In some embodiments, a pulse width modulation (PWM) circuit is utilized to vary a duty cycle of the power supply 302. In any such embodiments, and as discussed further below, the current sources 312 and 314 are controlled by the controller 306 in order to compensate for measured lumen depreciation, and thus maintain lumen output and/or maintain color balance over the lifetime of the lighting system 300.

Although the illumination and optical feedback 304 is depicted with two solid state light sources 320 and 322, it should be understood that numerous other light sources may be used in numerous configurations. For example, in some embodiment, the light sources 320 and 322 are the same type of solid state light source, and in some embodiments, are arrays of the same type of solid state light source. In some embodiments, the light source 320 and 322 include different types of solid state light sources, and/or arrays of different solid state light sources. For example, in some embodiments, the light source 320 emits light of a first color (e.g., red), and the light source 322 emits light of a second color (e.g., mint green) (i.e., a color mixing application). In some embodiments, the lighting system 300 is configured with more or fewer light sources. For instance, in some embodiments, the lighting system 300 includes only one light source, such as the light source 320. In such embodiments, the light source 320 may comprise a single solid state light source, or an array of solid state light sources. In some embodiments, the lighting system 300 includes three or more light sources, each having different or similar types of light sources. It should be apparent to one of ordinary skill in the art, having the benefit of reading this disclosure, that the light source 320 and 322 can be any type of light source in which lumen output may be measured, such as incandescent, electroluminescent, gas discharge, semiconductor based, combinations thereof, etc.

Still referring to FIG. 3, the illumination and optical feedback 304 also includes a photo detector 318 and a reference laser 316. The photo detector 318 is configured to measure lumen output from the light sources 320 and 322, and lumen output from the reference laser 316. In some embodiments, the photo detector 318 comprises a photo-diode and associated circuitry (e.g., an operational amplifier) to convert measured lumen output to a proportional electrical signal. In some embodiments, the photo detector 318 includes any suitable type(s) of light-sensitive detector device(s). For example, in some embodiments, the photo detector 318 comprises a silicon photo-diode configured to measure light output directly in lumens. In such embodiments, the photo detector 318 may include secondary optics, such as a filter, which closely approximates the response of a human eye in order to directly measure lumen output. In some embodiments, the photo detector 318 comprises a device that measures radiometric output and converts it to an appropriate photometric quantity, such as but not limited to radiant flux to luminous flux.

In some embodiments, the reference laser 316 is implemented as a laser diode or any low-cost laser source such as a solid state laser, or any other suitable directed light source capable of providing a relatively narrow directed beam of light (the golden sample). The suitability of the directed light source may be determined, for example, based on the light source's capability of generating a light beam having a low-divergence (e.g., 30° or less, or 20° or less, or 10° or less). To this end, the reference laser 316 may comprise any directed light source capable of generating a coherent or otherwise sufficiently collimated and focused beam with a sufficient signal to noise ratio, and having a relatively consistent lumen output over the target usage period (e.g., less than 5% deviation, or less than 2% deviation, or less than 1% deviation) accounting for on-time of that directed light source, and thus, allow for accurate measurements of the golden sample produced by the directed light source 316 by the photo detector 318. For example, in some embodiments, the directed light source 316 is comprised of an LED configured with secondary optics that collimates and focuses the light generated by the LED to provide a directed beam of light.

In various embodiments, the controller 306 comprises any microcontroller/microprocessor capable of receiving measurements from the photo detector 318 and implementing algorithms that convert the received measurements into drive signals, output by the power supply 302, in order to drive the light sources 320 and 322. It should be noted that although the controller 306 is illustrated as external to the power supply 302 and the illumination and optical feedback 304, the location of the controller 306 is not so limited. In some embodiments, the controller 306 is implemented in various places within the lighting system 300, such as but not limited to within the power supply 302, or within the illumination and optical feedback 304, or otherwise integral with a component or block of the lighting system 300.

Figure 4:
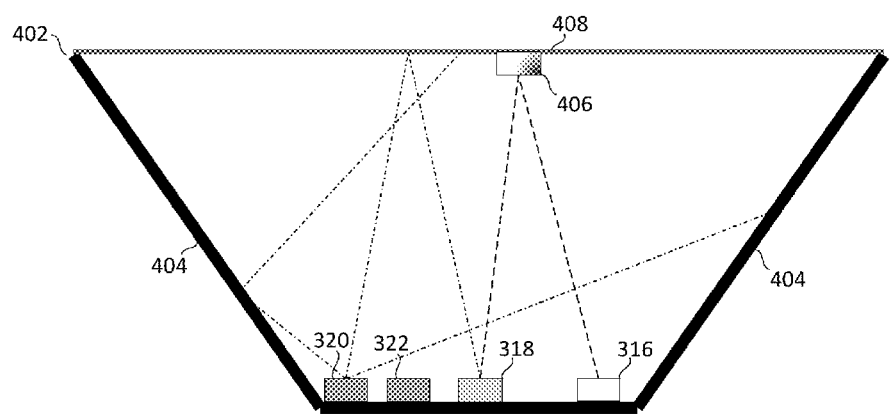
FIG. 4 is a side perspective view of a portion of a lighting assembly according to embodiments disclosed herein.

FIG. 4, with additional reference to FIG. 3, is a perspective side view of an enclosure 402 of a lighting system. As shown, the light enclosure 402 includes one or more reflectors 404, a mirror 406, and a diffuser 408. The light enclosure 402 also includes, similarly to the lighting system 300 of FIG. 3, a reference laser 316, a photo detector 318, and light sources 320 and 322. Typically, light output by the light sources 320 and 322 is reflected by the one or more reflectors 404 and dispersed by the diffuser 408 to emit uniformly dispersed light (e.g., without spots) in an area of the lighting system including the light enclosure 402 (e.g., in an office building). In some embodiments, the mirror 406 is positioned and angled relative to the reference laser 316 and the photo detector 318 in order to provide a direct path to the photo detector 318 for light emitted from the reference laser 316. Although a mirror is preferable, in some embodiments, a mirror is optional as the diffuser 408 may reflect a measurable amount of light from the reference laser 316 on to the photo detector 318. Alternatively, or additionally, in place of the mirror 406, a reflective component coated with a reflective coating and/or made from a reflective material and/or combinations thereof is used.

As will be discussed further below, the photo detector 318 can be configured such that a single detector (i.e., the photo detector 318) is sufficient to measure any number of light sources (such as the light sources 320 and 322) in various scenarios such as color mixing and single color (e.g., white) output.

Figure 5:
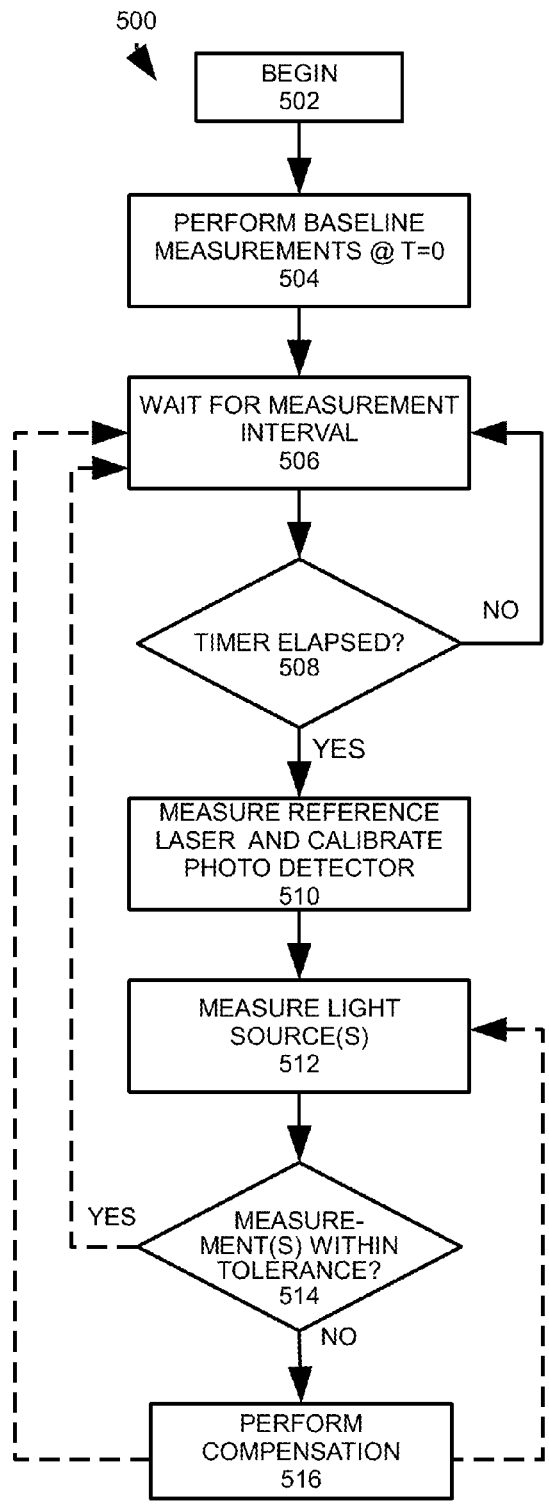
FIG. 5 shows a method of maintaining lumen output for a lighting assembly according to embodiments disclosed herein.

A flowchart of a method 500 of maintaining lumen output for a lighting system, such as but not limited to the lighting system 300 shown in FIG. 3, is depicted in FIG. 5. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Further, while FIG. 5 illustrates various operations, it is to be understood that not all of the operations depicted in FIG. 5 are necessary for other embodiments to function. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure. For ease of explanation, the method 500 is described below in relation to the lighting system 300 shown in FIG. 3, though of course those skilled in the art will readily understand how the method 500 is applied to any lighting system.

The method 500 of FIG. 5 includes steps of performing baseline measurements at T=0, waiting for the next measurement interval, measuring a reference laser (the golden sample), measuring one or more light sources, determining if the measurements are within predefined tolerances, and performing compensation. The method 500 starts with step 502, begin, in which the method 500 is initialized. The lighting system 300 is supplied initial power at a first time (i.e., at T=0), which results in various baseline measurements occurring, step 504. In some embodiments, the controller 306 gathers these baseline measurements for, for example, the light sources 320 and 322, and the reference laser 316. In some embodiments, the controller 306 supplies power to the reference laser 316 alone (leaving the light sources 320 and 322 powered off) in order to acquire a baseline measurement of just the reference laser 316. In such embodiments, a mirror may be used to reflect the light beam emitted from the reference laser 316 directly on to the photo detector 318, thus enhancing signal to noise ratio of measurements at the photo detector 318. The controller 306 may then turn off the reference laser 316 while supplying power to at least one of the light sources 320 and 322 to acquire baseline measurements for at least one of the light sources 320 and 322. For example, the controller 306 may power on both of the light sources 320 and 322 at the same time, if both comprise same and/or similar type(s) of light sources. In another example, the controller 306 powers on and off each of the light sources 320 and 322 in a sequential fashion, in order to acquire a separate baseline measurement for each light source. In any such embodiments, the baseline measurements for the reference laser 316 can be utilized to calibrate the photo detector 318. In addition, the baseline measurements for the light sources 320 and 322 can be utilized to compensate for measured lumen depreciation and/or color balance, as discussed further below.

The lighting system 300, having received input power, begins normal operation. A predetermined period of time then passes before a measurement interval is reached. The predetermined period of time may be, for example, 1,000 hours, 10,000 hours, or any other amount of time, at which point, the lighting system 300 switches from normal operation to the measurement and compensation routines described herein. In some embodiments, a timer is executed in order to measure whether the predetermined period of time has elapsed. Thus, the lighting system 300 waits for the measurement interval to occur, step 506. During this time, the controller 306 periodically checks if the measurement interval has been reached (e.g., by reading the timer), that is, if the predefined period of time has elapsed. If the timer has not elapsed, the lighting system continues to wait for the measurement interval, step 506. If the timer has elapsed, the lighting system 300, more specifically the controller 306 in some embodiments, measures the reference laser 316 and calibrates the photodetector 318, step 510.

In step 510, the controller 306 receives a lumen output measurement for the reference laser 316, in order to determine a calibration factor for the photo detector 318. Typically, calibration includes the controller 306 momentarily suspending power to the light sources 320 and 322 while powering on the reference laser 316. As discussed above, a photo detector will age over time, which may cause measurement results to vary despite the reference laser 316 having a consistent lumen output. Accordingly, the lumen output measurement received for the reference laser 316 from the photo detector 318 can be compared to the baseline value recorded in step 504 to determine a ratio. For instance, if the measured lumen output of the reference laser 316 at T=10,000 hours is at 95% of the lumen output measured at T=0, the controller 306 will calibrate subsequent measurements of one or more light sources by adjusting them by a calibration factor of +5%.

In step 512, the lighting system 300, more specifically in some embodiments the controller 306, measures the light source(s) 320 and 322, by receiving lumen output measurements for at least one of the light sources 320 and 322 from the photo detector 318. In embodiments where the light sources 320 and 322 are both the same type of light source, the controller 306 resumes power to the light sources 320 and 322 after suspending power to the reference laser 316 in step 510. To this end, the controller 306 can then receive a single lumen output measurement from the photo detector 318 for both of the light sources 320 and 322. As discussed further below, the single lumen output measurement is stored in a memory of the controller 306 and used in subsequent steps to compensate for lumen depreciation. In embodiments where the light sources 320 and 322 are of different types (e.g., in color mixing applications), the controller 306 may turn on each light source in a sequential fashion, in order to measure each light source 320 and 322 separately. In some embodiments, these measurements are used in a subsequent color balancing and/or lumen output compensation routine described further below. In any such embodiments, the lumen output measurement for a single type of light source, or for different types of light sources, can be adjusted according to the calibration factor determined in step 510 and recorded in a memory of the controller 306.

The controller 306 then determines whether the lumen output measurements are within an acceptable predefined tolerance, step 514. As used herein, a predefined tolerance is defined as a threshold percentage of deviation from a baseline measurement before the controller 306 determines compensation is necessary. In some embodiments, any amount of deviation may necessitate compensation. In other embodiments, the percentage of deviation may be based on a threshold of depreciation such as 1%, 5%, 10%, etc. As should be recognized, different lighting applications may necessitate a lower threshold than others. For instance, general lighting in an operating room may necessitate compensation for any amount of measured deviation. In other instances, such as general illumination in an office, a threshold of 5% or more may be utilized. It should be further recognized that a lighting system, such as lighting system 300, can be configured in numerous ways depending on the lighting application (e.g., color mixing versus single color). To this end, lumen output measurements recorded in step 512 can be analyzed in different ways to determine whether compensation is required depending on the configuration. For example, in some embodiments, the lighting system 300 is configured with a single type of light source, which can be measured at a particular measurement interval (e.g., T=10,000 hours), and this measurement can be compared to the baseline measurement recorded in step 504 to determine a corresponding ratio. For instance, if a measured lumen output at T=10,000 hours is measured at 95% of the baseline lumen output measurement, a ratio of 0.95:1 is established. Thus, the determined relative difference represents the amount of lumen depreciation for the measured light source relative to the baseline measurement (e.g., at T=0). If the relative difference exceeds the predefined tolerance, the method 500 continues to step 516 to perform compensation. In some embodiments where the lighting system is configured with different types of light sources (e.g., the light source 320 emits light of a first color, the light source 322 emits light of a second color that is different from the first color), measurements may be interpreted to maintain lumen output and color balance, or alternatively, to maintain color balance alone. In regard to the former case, individual measurements recorded in step 512 may be compared against the baseline measurements of step 504 to determine a relative difference. This is similar to the approach discussed above, except that a relative difference is determined and recorded individually for each type of light source in this scenario. Likewise, in some embodiments, if one or more of the relative differences exceeds the predefined tolerance, the controller 306 performs compensation as required in step 516.

In regard to maintaining color balance alone, in some embodiments, the controller 306 can utilize the baseline measurements recorded in step 504 to determine a baseline color balance ratio. In some embodiments, this baseline color balance ratio is utilized at measurement intervals (e.g., T=10,000 hours, T=20,000 hours, T=30,000 hours, etc.) to maintain color balance. By way of example, and not meant to limit the present disclosure, consider a lighting system configured with a first light source 320 emitting light of a first color (e.g., white light) and a second light source 322 emitting light of a second color (e.g., red light), and having an initial (T=0) white to red color balance of 2:1. Further, consider that at a measurement interval of T=20,000 hours, the individual measurements recorded in step 512 indicate a relative drop in the color balance ratio to that of 1.9:1 (white to red). As discussed below, in examples such as this, the controller 306 in step 516 compensates by increasing (or decreasing) current to the first light source 320, until the color balance returns back to the baseline color balance ratio of 2:1.

Thus, in step 516, the controller 306 adjusts a drive current of at least one of the light sources 320 and 322, in order to compensate for lumen depreciation and/or to maintain color balance. In various embodiments, the relative difference (i.e., the ratio) between the measured lumen output of a light source recorded in step 512 and a baseline measurement of the same recorded in step 504 is used to proportionally adjust a drive current up or down. In such embodiments, the drive current may then be supplied to at least one of the light sources 320 and 322 via the current sources 312 and 314. The method 500 then returns to step 506, and the lighting system 300 operates in a normal mode (e.g., emits light from the light sources 320 and 322) until the next measurement interval is reached. For example, if the lumen depreciation is measured at 5% (a ratio of 1:0.95) for both of the light sources 320 and 322, the light sources 320 and 322 can be provided with a 5% increase in drive current to account for the depreciation before the method 500 returns to step 506 to wait for the next measurement interval to pass.

However, in some embodiments, increasing/decreasing drive current in proportion to the measured lumen depreciation does not necessarily lead to a linear response in lumen output of the lighting system 300. Accordingly, drive current may be incrementally increased/decreased (e.g., by 1%, 2%, etc.) with the method 500 returning to step 512 until each of the light sources 320 and 322 measures within an acceptable tolerance of the baseline measurements recorded in step 504. This incremental approach may be particularly well suited for maintaining color balance in color mixing applications. In this manner, the controller 306 can direct small current adjustments to one or more light sources of a particular color until color balance returns to substantially that of baseline measurements.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), handheld device(s) such as cellular telephone(s) or smart cellphone(s) or tablets, laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (ASIC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lighting assembly, comprising:
a diffusible light source to illuminate an area by providing light output, wherein the provided light output is measured in lumens;
a photo detector configured to measure lumen output of the diffusible light source and a golden sample light beam; and
a directed light source to provide the golden sample light beam, wherein the golden sample light beam is used to calibrate the photo detector.

2. The lighting assembly of claim 1, further comprising:
a controller configured to determine a photo detector calibration factor based on a first lumen output measurement of the directed light source and a second lumen output measurement of the directed light source, the calibration factor indicative of photo detector degradation over a period of time between the first lumen output measurement and the second lumen output measurement.

3. The lighting assembly of claim 2, wherein the controller is further configured to command application of a drive signal to the lighting assembly, the drive signal accounting for the photo detector calibration factor so as to compensate for photo detector degradation, wherein the drive signal causes the diffusible light source to illuminate an area by providing light.

4. The lighting assembly of claim 1, wherein the diffusible light source comprises one or more solid state light sources.

5. The lighting assembly of claim 1, wherein the directed light source comprises a laser.

6. The lighting assembly of claim 1, wherein the directed light source comprises a mirror to direct the golden sample light beam to the photo detector.

7. The lighting assembly of claim 6, further comprising an enclosure, wherein the diffusible light source, the photo detector, the directed light source and the mirror are all located within the lighting assembly in an area defined in part by the enclosure.

8. The lighting assembly of claim 1, wherein the diffusible light source receives a drive signal, wherein the drive signal accounts for a photo detector calibration factor so as to compensate for degradation of the photo detector.

9. The lighting assembly of claim 1, further comprising an enclosure, wherein the diffusible light source, the photo detector, and the directed light source are all located within the lighting assembly in an area defined in part by the enclosure.

10. The lighting assembly of claim 1, further comprising a diffuser coupled to the enclosure, wherein the diffuser directs the golden sample light beam to the photo detector, and wherein the diffusible light source, the photo detector, and the directed light source are all located in an area defined by the enclosure and the diffuser coupled thereto.

11. The lighting assembly of claim 1, further comprising a reflective component, wherein the reflective component directs the golden sample light beam to the photo detector, and wherein the diffusible light source, the photo detector, and the directed light source are all located within the lighting assembly in an area defined in part by the enclosure.

* * * * *